United States Patent Office 3,157,664
Patented Nov. 17, 1964

3,157,664
ENOLIC ETHERS AND ESTERS
Horace A. De Wald, Ann Arbor, Mich., assignor to Parke, Davis & Company, Detroit, Mich., a corporation of Michigan
No Drawing. Filed Mar. 11, 1963, Ser. No. 264,041
7 Claims. (Cl. 260—295)

The present invention relates to enolic ethers and enolic esters. More particularly, it relates to enolic ethers and enolic esters which can be represented in free base form by the formula

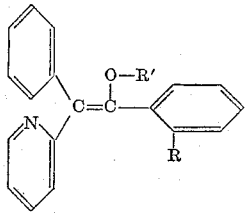

and to methods for their production; where R represents lower alkyl or halogen and R' represents lower alkyl or lower alkanoyl. In the compounds of the invention, the preferred lower alkyl groups are methyl and ethyl, the preferred lower alkanoyl groups are acetyl and propionyl, and the preferred halogen is chlorine.

In accordance with the invention, compounds of the foregoing formula are produced by reacting a compound which can be represented by the formula

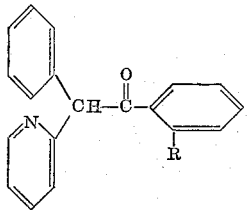

or an enolic form thereof with an alkylating agent or an alkanoylating agent; where R and R' are as defined before. Some examples of suitable alkylating agents are esters of lower alkanols such as alkyl halides and dialkyl sulfates. Other alkylating agents such as trialkyloxonium fluoroborates, $(alkyl)_3O^+BF_4^-$, can also be used. The product obtained by reaction with an alkylating agent is an enolic ether, in which R' is a lower alkyl group. Some examples of suitable alkanoylating agents are reactive derivatives of lower alkanoic acids such as acid halides and acid anhydrides, as well as lower alkenyl esters of lower alkanoic acids such as isopropenyl acetate. The product obtained by reaction with an alkanoylating agent is an enolic ester, in which R' is a lower alkanoyl group. The substances being reacted with an alkylating agent or an alkanoylating agent, although for convenience represented in the foregoing formula as having a ketonic structure, can also exist in equivalent tautomeric forms, the cis enol and the trans enol, as well as in equivalent salt forms of the enolic structure such as for example the sodium, potassium, and lithium salts. In the foregoing definition of the substances employed as starting materials in the process of the invention, the term "enolic forms" refers to the cis and trans enols and their salts.

In carrying out the process of the invention, in the case of reaction with an alkylating agent, at least an equimolar amount or if desired a moderate excess of the alkylating agent can be used. When the alkylating agent is an ester of a lower alkanol such as an alkyl halide or a dialkyl sulfate, the reaction is preferably carried out in an alkanol or an aqueous alkanol in the presence of a base such as an alkali metal hydroxide in which case the starting material is present as an enolate salt. When the alkylating agent is a trialkyloxonium fluoroborate, the reaction is preferably carried out in a solvent such as benzene, dioxane, tetrahydrofuran, dimethylformamide, ethylene dichloride or diethylene glycol dimethyl ether. The alkylation proceeds quite readily under mild reaction conditions and is carried out at between 0°–100° C. for from 30 minutes to 48 hours, the longer reaction times being used at lower temperatures. Reaction conditions somewhat outside of this range will also give satisfactory results. The use of vigorous reaction conditions with an excess of alkylating agent can also produce some quaternary ammonium salt as a side reaction.

In carrying out the process of the invention, in the case of reaction with an alkanoylating agent, at least an equimolar amount and if desired an excess of the alkanoylating agent is used. When the alkanoylating agent is a lower alkenyl ester of a lower alkanoic acid, it is preferable to use a large excess of the alkanoylating agent. Some suitable solvents are benzene, dioxane, tetrahydrofuran, dimethylformamide, ethylene dichloride, or diethylene glycol dimethyl ether. When the alkanoylating agent is a lower alkenyl ester of a lower alkanoic acid, such as isopropenyl acetate, a preferred solvent for the reaction is an excess of the alkanoylating agent with a catalytic amount of a mineral acid. When the alkanoylating is an acid halide or an acid anhydride, a preferred solvent for the reaction is pyridine. The reaction is normally carried out at temperatures from about 0° C. to 100° C. or the reflux temperature of the solvent, the lower temperatures being preferred when the reaction is carried out with an acid chloride and the higher temperatures being preferred when the reaction is carried out with a lower alkenyl ester of a lower alkanoic acid. Depending on the temperature and the specific alkanoylating agent, the reaction is carried out for from 30 minutes to 48 hours.

The ketones and their enolic forms employed as starting materials in the process of the invention can be prepared in a number of ways. For example, a benzonitrile compound of the formula

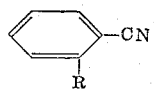

is reacted with a reactive metal derivative such as the lithium derivative of 2-benzylpyridine under anhydrous conditions, followed by hydrolysis of the reaction mixture with water or ammonium chloride solution to yield an imine, followed thereafter by hydrolysis with mineral acid to yield a ketone or an enolic form thereof; where R is as defined before. Alternatively, a compound of the formula

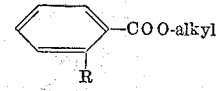

is reacted with a reactive metal derivative of 2-benzylpyridine under anhydrous conditions, followed by hydrolysis of the reaction mixture with water or ammonium chloride solution to yield a ketone or an enolic form thereof; where R is as defined before. Enolate salts employed as starting materials can be produced by the reaction of a corresponding ketone or enol with a base such as an alkali metal alkoxide or an alkali metal hydroxide.

The compounds of the invention are preferably produced and used in the forms of their free bases. Alternatively, by pH adjustment or by reaction of a free base with an acid, preferably under anhydrous conditions, the compounds of the invention can be produced and used in acid-addition salt form. The acid-addition salt forms are comparatively unstable and tend to revert to the free bases but in other respects they are equivalent to the free bases for the purposes of the invention.

The compounds of the invention have useful pharmacological and particularly hormonal properties. They are ovulation inhibitors and consequently are of value as antifertility agents. In addition, they are hypocholesteremic agents and cause a decrease in blood cholesterol. They are active upon oral administration but can also be given by the parenteral route if desired.

The invention is illustrated by the following examples.

*Example 1*

A solution of 6 g. of α-phenyl-α-(2-pyridyl)-2-chloroacetophenone in 75 ml. of isopropenyl acetate is treated with two drops of concentrated sulfuric acid and slowly distilled so that 50 ml. of distillate is collected over a period of three hours. The remaining mixture is stirred with 150 ml. of chloroform. The chloroform solution is separated, washed with saturated sodium chloride solution, dried, and evaporated under reduced pressure to give a residue of the crude acetate ester of α-(o-chlorophenyl)-β-phenyl-2-pyridineethenol; M.P. 134–136° C. following crystallization from ethyl acetate-petroleum ether.

By the foregoing procedure, with the substitution of 6 g. of α-phenyl-α-(2-pyridyl)-2-bromoacetophenone for the α-phenyl-α-(2-pyridyl)-2-chloroacetophenone, the product obtained is the acetate ester of α-(o-bromophenyl)-β-phenyl-2-pyridineethenol.

By the foregoing procedure, with the substitution of 6 g. of α-phenyl-α-(2-pyridyl)-2-ethylacetophenone for the α-phenyl-α-(2-pyridyl)-2-chloroacetophenone, the product obtained is the acetate ester of α-(o-ethylphenyl)-β-phenyl-2-pyridineethenol.

By the foregoing procedure, with the substitution of 6 g. of α-phenyl-α-(2-pyridyl)-2-methylacetophenone for the α-phenyl-α-(2-pyridyl)-2-chloroacetophenone, the product obtained is the acetate ester of α-(o-methylphenyl)-β-phenyl-2-pyridineethenol; M.P. 144–147° C.

*Example 2*

A solution of 2 g. of α-phenyl-α-(2-pyridyl)-2-methylacetophenone in 15 ml. of pyridine and 5 ml. of acetic anhydride is allowed to stand at 25° C. for 48 hours. Unreacted acetic anhydride is decomposed by the cautious addition of water with external cooling to maintain the temperature below 35° C. The mixture is then diluted with 100 ml. of water and the insoluble acetate ester of α-(o-methylphenyl)-β-phenyl-2-pyridineethenol which separates is collected; M.P. 144–147° C. following crystallization from ethyl acetate-petroleum ether.

By the foregoing procedure, with the substitution of 5 ml. of propionic anhydride for the acetic anhydride, the product obtained is the propionate ester of α-(o-methylphenyl)-β-phenyl-2-pyridineethenol.

*Example 3*

A solution of 6.2 g. of α-phenyl-α-(2-pyridyl)-2-chloroacetophenone in 50 ml. of ethylene dichloride is treated with 7.6 g. of triethyloxonium fluoroborate. The reaction mixture is allowed to stand at 25° C. for 20 hours and is then evaporated to dryness under reduced pressure. The residue is dissolved in chloroform and the chloroform solution is washed with sodium bicarbonate solution and with sodium chloride solution, dried over magnesium sulfate, filtered and evaporated under reduced pressure. The residue is crude 2-(α-phenyl-β-ethoxy-o-chlorostyryl)pyridine. For purification, the product is dissolved in ether containing 30% methanol and the solution is chromatographed over activated magnesium silicate using additional quantities of the same solvent for elution. The product is recovered from the eluate and recrystallized from petroleum ether; M.P. 72–74° C.

By the foregoing procedure, with the substitution of 6.0 g. of α-phenyl-α-(2-pyridyl)-2-ethylacetophenone for the α-phenyl-α-(2-pyridyl)-2-chloroacetophenone, the product obtained is 2-(α-phenyl-β-ethoxy-o-ethylstyryl)pyridine.

By the foregoing procedure, with the substitution of 5.7 g. of α-phenyl-α-(2-pyridyl)-2-methylacetophenone for the α-phenyl-α-(2-pyridyl)-2-chloroacetophenone, the product obtained is 2-(α-phenyl-β-ethoxy-o-methylstyryl)pyridine; M.P. 71–73° C.

The corresponding 2-(α-phenyl-β-methoxy-o-substituted styryl)pyridine compounds are obtained by using an equivalent amount of trimethyloxonium fluoroborate in place of the triethyloxonium fluoroborate.

*Example 4*

With stirring, a mixture of 2.8 g. of α-phenyl-α-(2-pyridyl)-2-methylacetophenone in 70 ml. of 50% ethanol is treated at 40–50° C. with a total of 1.5 g. of diethyl sulfate and 6 ml. of 2 N sodium hydroxide, added alternatively and in small portions so that the reaction mixture remains slightly basic. After 30 minutes, most of the ethanol is removed by evaporation under reduced pressure and the insoluble precipitate of 2-(α-phenyl-β-ethoxy-o-methylstyryl)pyridine is collected; M.P. 71–73° C. following crystallization from petroleum ether.

By the foregoing procedure, with the substitution of 1.3 g. of dimethyl sulfate for the diethyl sulfate, the product obtained is 2-(α-phenyl-β-methoxy-o-methylstyryl)pyridine.

By the foregoing procedure, with the substitution of 3.5 g. of α-phenyl-α-(2-pyridyl)-2-bromoacetophenone for the α-phenyl-α-(2-pyridyl)-2-methylacetophenone, the product obtained by reaction with diethyl sulfate is 2-(α-phenyl-β-ethoxy-o-bromostyryl)pyridine.

Starting materials required in carrying out the process of the invention can be obtained in a number of ways, of which the following are specific illustrations. 23 g. of 2-benzylpyridine is added to a solution of phenyllithium (prepared from 2.1 g. of lithium and 23 g. of bromobenzene in 100 ml. of ether) and the mixture is heated under reflux for one-half hour. A solution of 16.5 g. of o-chlorobenzonitrile in 100 ml. of ether is added and the mixture is heated under reflux for three more hours, cooled, and stirred with 250 ml. of ice water. The ether solution is separated, dried, and evaporated under reduced pressure to give a residue of crude 2-[α-(o-chlorobenzimidoyl)benzyl]pyridine. For purification the product can be dissolved in ether, the solution chromatographed on alumina and the solid fractions recovered from the eluates; recrystallized from methanol, M.P. 86–88° C. A solution of 21.7 g. of 2-[α-(o-chlorobenzimidoyl)benzyl]pyridine in 150 ml. of 85% phosphoric acid is maintained at 25° C. for 20 hours and then poured with stirring into 2 liters of ice water. The insoluble α-phenyl-α-(2-pyridyl)-2-chloroacetophenone which separates is collected on a filter, washed with water and dried; M.P. 135–137° C.

A solution of 15.3 g. of diethylamine in 50 ml. of anhydrous ether is added to a solution of 49 g. of 23.7% n-butyllithium (in heptane) in 75 ml. of anhydrous ether. The mixture is stirred for 30 minutes and then a solution of 31.8 g. of 2-benzylpyridine in 50 ml. of ether is added with external cooling to maintain the temperature at about 25° C. Thirty minutes later, 32.7 g. of o-bromobenzonitrile in 50 ml. of ether is added and the mixture is stirred for 2½ days and decomposed by stirring with saturated ammonium chloride solution. The ether layer is separated, dried, and evaporated to give a residue of 2-[α-(o-bromobenzimidoyl)-benzyl]pyridine; M.P. 107–109° C. after crystallization from methanol. A solution of 20 g. of 2-[α-(o-bromobenzimidoyl)-benzyl]pyridine in 150 ml. of 85% phosphoric acid is maintained at 25° C. for 20 hours and then poured with stirring into 2 liters of ice water. The insoluble α-phenyl-α-(2-pyridyl)-2-bromoacetophenone which separates is collected on a filter, washed with water and dried; M.P. 141–142.5° C.

A solution of phenyllithium is prepared by adding a solution of 187 g. of bromobenzene in 500 ml. of anhydrous ether with vigorous stirring to 17 g. of lithium chips in 500 ml. of anhydrous ether. The mixture is maintained under reflux by regulating the rate of addition and is stirred for 30 minutes after the addition is complete. With continued stirring, a solution of 210 g. of 2-benzylpyridine in 500 ml. of anhydrous ether is added to the solution of phenyllithium at such a rate that the ether is maintained at reflux. The reaction mixture which now contains the lithium derivative of 2-benzylpyridine is stirred for one more hour and then a solution of 117 g. of o-methylbenzonitrile in 200 ml. of anhydrous ether is added. The mixture is heated under reflux for 12 hours, chilled, and stirred with 300 ml. of saturated aqueous ammonium chloride solution. The ether layer is separated, dried over anhydrous magnesium sulfate, and concentrated to give an oily residue of 2-[α-(o-methylbenzimidoyl)benzyl]pyridine; B.P. 180–190° C. at 0.3 to 0.5 mm. For further purification, the compound can be crystallized from methanol; M.P. 76–80° C. By the same general procedure, using 12.5 g. of phenyllithium and 22 g. of 2-benzylpyridine, and with the substitution of 15.7 g. of o-ethylbenzonitrile for the o-methylbenzonitrile, the product obtained is 2-[α-(o-ethylbenzimidoyl)benzyl]pyridine; M.P. 98–100° C. after crystallization from methanol.

A solution of 5 g. of 2-[α-(o-methylbenzimidoyl)benzyl]pyridine in 500 ml. of 0.1 N hydrochloric acid is maintained at 37° C. for 24 hours. The α-phenyl-α-(2-pyridyl)-2-methylacetophenone which separates is collected on a filter, washed with water and dried; M.P. 145–147° C. By the same general procedure, the product obtained from 2-[α-(o-ethylbenzimidoyl)benzyl]pyridine is α-phenyl-α(2-pyridyl)-2-ethylacetophenone; M.P. 118–121° C.

I claim:
1. A compound of the formula

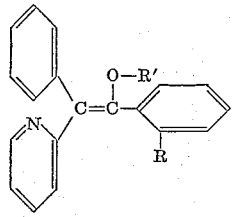

where R is a member of the class consisting of lower alkyl and halogen, and R' is a member of the class consisting of lower alkyl and lower alkanoyl.

2. 2 - (α-phenyl-β-lower alkoxy-o-methylstyryl)-pyridine.

3. 2 - (α-phenyl-β-ethoxy-o-methylstyryl)pyridine.

4. 2 - (α-phenyl-β-lower alkoxy-o-chlorostyryl)pyridine.

5. 2 - (α-phenyl-β-ethoxy-o-chlorostyryl)pyridine.

6. Acetate ester of α-(o-methylphenyl)-β-phenyl-2-pyridineethanol.

7. Acetate ester of α-(o-chlorophenyl)-β-phenyl-2-pyridineethanol.

No references cited.